United States Patent [19]

Baumann et al.

[11] 3,884,855

[45] May 20, 1975

[54] PROCESS FOR THE PRODUCTION OF REGENERATE FROM POLYPROPYLENE WASTE

[75] Inventors: Reinhold Baumann, Hausen; Robert Lauerbach-Lemeier; Ernst-Günter Kunze, both of Frankfurt am Main; Alfred Striebich, Bischofsheim; Hans-Joachim Rothe, Bad Vilbel, all of Germany

[73] Assignee: Davy-Ashmore Aktiengesellschaft, Germany

[22] Filed: Nov. 2, 1973

[21] Appl. No.: 412,133

Related U.S. Application Data

[63] Continuation-in-part of Ser. No. 237,174, March 22, 1972, Pat. No. 3,789,026.

[30] Foreign Application Priority Data

Mar. 24, 1971 Germany............................ 2114304

[52] U.S. Cl.............. 260/2.3; 162/157 R; 260/93.7; 260/94.9 F; 260/94.9 GD; 264/37; 264/DIG. 69

[51] Int. Cl.......................... C08f 47/24; C08f 29/02
[58] Field of Search ........ 260/2.3, 94.9 F, 94.9 GD; 264/DIG. 69, 37; 162/157 R

[56] References Cited
UNITED STATES PATENTS

| | | | |
|---|---|---|---|
| 3,223,581 | 12/1965 | Sommer et al. | 162/157 R |
| 3,344,218 | 9/1967 | Chopra et al. | 260/2.3 |

*Primary Examiner*—Wilbert J. Briggs, Sr.
*Attorney, Agent, or Firm*—Molinare, Allegretti, Newitt & Witcoff

[57] ABSTRACT

Regenerate produced from "wool," fiber, band and foil waste products from a polypropylene process are processed to produce a material suitable for reintroduction into the process. The polypropylene regenerate is produced by comminuting the waste and forming a fleece. The fleece is washed and dried, divided into fiber clusters, and the clusters are compacted. The compacted product, after granulation, may be passed back to the high polymer process.

12 Claims, No Drawings

PROCESS FOR THE PRODUCTION OF REGENERATE FROM POLYPROPYLENE WASTE

CROSS REFERENCE TO RELATED APPLICATION

This application is a continuation-in-part of our co-pending application Ser. No. 237,174, filed Mar. 22, 1972, now U.S. Pat. No. 3,789,026.

BACKGROUND OF THE INVENTION

The invention relates to a process for the production of regenerate from polypropylene waste materials formed during the production of polypropylene thread, fibers and bands. The starting materials for this process are present in the form of a wool-like substance (an entangled mass), fibers, bands, foils and the like from polypropylene and copolymers of polypropylene.

In the production of threads, fibers and bands of polypropylene there arise in the various process stages relatively large amounts of waste threads, fibers and bands, designated herein as waste products. These waste products are not suitable for subsequent processing stages. For example, in starting and stopping the spinning process, in charge-change, and color change in a spinning installation directly at the spinnerette, there are waste products in the form of a wool like substance often referred to as wool. In the winding, stretching, crimping, texturizing and other processing stages, there likewise result waste products in the form of threads, fibers or bands, which are excluded from further processing at the beginning or termination of bobbin winding as being insufficiently stretched, because of inaccuracy of denier etc. The proportion of waste products in the production of synthetic polypropylene fiber materials can, to be sure, be reduced to a minimum by exact process conduction and a matured process, but can never be entirely avoided. In any case, the production of waste represents an appreciable cost factor which burdens the profitability of a spinning installation. Depending on the particular fabrication conditions, the proportion of the waste products can amount to up to 10% of the total production.

The problem of the waste products from spinning plants acquires a further importance because the threads, fibers, bands, etc. frequently produced as waste have satisfactory to good properties in respect to their chemical composition and have to be removed from the production process only because of their physical form and properties, such as, for example, imprecisions in denier, color deviations, initial spinning losses, etc. Because of the great spatial volume and non-decomposability of polypropylene, there arise further difficulties in their storage, elimination and possible destruction. Frequently, therefore, the practice has taken to collect these waste products at the place they are produced or arise, reducing them by means of suitable presses to a smaller bulk and supplying them at a low price to a further-processing industrial enterprise, which converts the pressed waste products, for example, into injection molding parts, in which damage and chemical decomposition of the reprocessed product are not important or harmless. In part, the waste products are also worked up or converted into a more space-saving form. In this conversion, because of the bulkiness of wool, fibers, and bands and the like, there is low capacity utilization of the processing devices involved. Depending on the desired purpose of use, a processing method is chosen which yields or produces the worked-up waste product in more or less pure form.

A process is known by which the waste products from a polypropylene process are first freed of unstable agents or those which would react with the polypropylene under treatment conditions, as well as finishes, preparations and sizings which have been applied to the final polypropylene product. It has already been proposed to wash the waste products by means of a suitable washing machine with addition of synthetic fat-dissolvers and dispersing agents, and to dry the thereupon rinsed waste products in a cabinet drier and to cut them up in a fiber-cutting machine to a size less than 35 mm. In this case the washing and drying procedure cannot be very effective, because of the bad rinsing and drying possibilities of the fiber-surface within the fiber bulks. The cutting stage after the washing and drying steps cannot improve the preceding steps.

The described known processes for the working up of waste products, in each case, involve a definite process stage, which is suited exclusively for the charge-wise processing of a starting material as polypropylene. Frequently there can be processed only waste products which are taken from a certain stage of the production process, so that in each case only a small part of the fibers, threads, bands, and the like excluded in a spinning process can be utilized.

Underlying the present invention, therefore, is the problem of developing a process which avoids the disadvantages mentioned, and processes polypropylene waste products from diverse production stages. These waste products can be entirely worked up, rapidly and gently, into a regenerate which is suited for the production of high-quality products.

SUMMARY OF THE INVENTION

According to the present invention, the problem set forth is solved by a process where the polypropylene waste products are continuously comminuted, spread out into a fleece and deposited on a continuous conveyance apparatus. The fleece is then washed, squeezed out, preferably loosened up if too dense, and dried. The fleece is then divided into fiber clusters which are mechanically compacted with or without the addition of a lubricant, and, finally, mechanically granulated. The process of the invention makes it possible to work up waste products, especially from the production of polypropylene synthetic fibers, in a single, continuous working-up process into a valuable regenerate which can be reused for the production of fibers, threads, bands and the like. In the present process it is not important what processing stage the waste product to be worked up had previously been run through. The wool leaving the spinnerette is just as well suited for the production of regenerate as the bands or texturized fibers provided with finishes and preparations, since depending on the requirements, the individual process stages can easily be regulated and adjusted independently of one another with respect, for example, to the temperature, residence time and thickness of the fleece. A further substantial advantage of the invention is that polypropylene from all process stages can be worked up with the aid of the proposed process.

The process of the invention is characterized according to a further embodiment in that the comminution is accomplished by cutting the material to a size between 1 and 15 mm with respect to the greatest dimension, and the granulate size is between 0.5 and 10 mm, preferably 2 and 6 mm. The fleece density and the fleece thickness can be optimally adjusted to the particular degree of fouling with the proposed size waste products, without there arising, through the comminution, any harmful proportions of dust-like constituents so that the subsequent washing and drying operation could be disturbed. The proposed granulate size is excellently suited for the reuse of the regenerate and, as it is provided, in a further form of execution of the process of the invention, may be returned continuously as regenerate into a main product stream. Through this process, all the waste products taken from the treatment process are immediately worked and again fed into the main product stream and thereby contribute in a manner, as simple as it is effective, to an improved economy thereby increasing the profitability of the spinning plant.

For the production of a delustered product one embodiment of the process of the invention provides that there is added 0.01 to 10% by weight of one or more additives such as titanium dioxide, carbon black or a dye pigment. This additive can be added with the lubricant if a lubricant is used. Although a lubricant can be used for the compacting procedure, such is not absolutely necessary because of the inherent lubricity of the polypropylene. In the compacting step, any additives may be intimately worked into the polypropylene waste products, so that the process of the invention can be used at any time for the production of concentrate granulate of polypropylene waste products. A further proposal for the advantageous execution of the process of the invention is characterized in that the temperature of the washing bath lies between 20° and 60°C, preferably 40°–60°C and the percentage-by-weight constituent of the washing agent amounts to 0.05 to 0.9. The impurities as well as finishes and preparations of the waste products are hereby removed completely and gently. In order to completely preclude any thermal damage and depolymerization, the drying temperature, according to a further proposal of the process of the invention, lies between 20° and 60°C with a residence time of the fleece in the drying chamber or zone from 2 to 15 minutes. The compacting process takes place advantageously under the action of high sheering forces in a disk compactor with heat removal. The waste products are thereby heated only by the frictional forces occurring and are easily fused and cemented with one another on the surface. If necessary, a proposal of the process of the invention provides that the compacting process takes place under exclusion of oxygen. In this case it is expedient to carry out, for example, a nitrogen blanket or veiling or thereby to counteract any possible yellowing of the product worked up according to the process of the invention.

EXAMPLE

Polypropylene staple fibers having a tenacity of 5.0 g/denier, an elongation at break of 12%, a water content of less than 0.01% by weight and an individual denier of 8 den. was cut with a cutting mill with a 15 mm sieve to a mean fiber length of 10 mm and conveyed by a blower into a cyclone separator mounted over a box feeder. Through the action of the box feeder and connected lattice, a uniform fiber fleece of 15 mm in thickness was formed which was then delivered to a washing machine. In the washing machine, water was used as a washing bath at a temperature of about 30°C. The water also contained 0.1% by weight of a commercially available detergent as a washing agent. Ten liters of fresh water per kg of fibers were added for the removal of the preparation, dust-like constituents and other impurities. The residence time of the fleece in the washing bath was 30 minutes. The washing machine used was a brief-wash machine with a squeezing or wringing mechanism at the discharge end, which squeezed out the major part of the water adhering to the fiber to provide a fiber with a final water content of about 20% by weight. The fibers concentrated by the squeezing mechanism were again loosened up to form a fleece in a fiber opener and thereupon conveyed to a drier. The drying of the fiber fleece was accomplished by a sieve-drum drier maintained at a temperature of 60°C and a residence time of 10 minutes. The final moisture content of the dried fiber was less than 0.01% by weight. The fibers were then conveyed, in a supply container, to a compacting apparatus wherein a blower beat the fiber fleece into small fiber clusters having a bulk weight of 0.11 kg/liter. The fiber material was then sintered in a disk compactor and cut in a cutting mill into a granulate with a grain size of 3 × 3 mm. The bulk weight of the granulate was 0.35 kg/liter. The regenerate was mixed with a new polypropylene granulate in a proportion of 1 : 10, extruded and spun to fibers showing the same quality as the original fibers.

We claim as our invention:

1. A process for the production of regenerate from the waste product from a process for producing synthetic polypropylene fibers, said polypropylene waste products comprising wool, fibers, bands or foil which comprises the steps of:
   i. cutting the polypropylene waste product to produce a cut waste product;
   ii. spreading the cut waste products into a fleece;
   iii. washing said fleece in a washing zone to produce a wet, washed fleece;
   iv. drying the washed fleece in a drying zone to produce a dried fleece;
   v. dividing said fleece into fiber clusters;
   vi. compacting the fiber clusters to produce a compacted waste material; and
   vii. granulating the compacted waste material to produce a regenerate.

2. A process according to claim 1 wherein the cutting of step (i) is accomplished by cutting the waste product to a size between 1 and 15 mm with respect to the greatest dimension and the granulate size amounts to between 2 and 6 mm.

3. A process according to claim 1 wherein the granulated regenerate is returned to a main product stream in the polymer process by means of a degasing extruder.

4. A process according to claim 1 wherein the fiber clusters are compacted in the compacting step in admixture with a lubricant.

5. A process according to claim 1 wherein there is added at least one additive to generate a delustered material, said additive added in an amount of 0.01% to 10% by weight of the waste products.

6. A process according to claim 5 wherein said additive is titanium dioxide, carbon black or a dye pigment.

7. A process according to claim 1 wherein the temperature of the washing step is between 20° and 60°C and the washing step is affected with an aqueous solution containing 0.05% to 0.9% by weight washing agent.

8. A process according to claim 1 wherein the drying tempeature is between 20° and 60°C with a residence time of the waste in the drying zone of 2 to 15 minutes.

9. A process according to claim 1 wherein the compacting process is effected under the action of high sheering forces in a disk compactor with heat withdrawal.

10. A process according to claim 1 wherein the compacting operation takes place under exclusion of oxygen.

11. A process according to claim 1 wherein said fleece is squeezed of moisture to produce a squeezed fleece prior to the drying step.

12. A process according to claim 11 wherein the squeezed fleece is loosened before the drying step.

* * * * *